United States Patent
Wang et al.

(10) Patent No.: US 11,967,982 B2
(45) Date of Patent: Apr. 23, 2024

(54) METHOD FOR REAL-TIME PROCESSING OF A DETECTION SIGNAL AND A DETECTOR

(71) Applicants: Mettler-Toledo (Changzhou) Measurement Technology Co., Ltd, Changzhou (CN); Mettler-Toledo (Changzhou) Precision Instruments Co., Ltd, Changzhou (CN); Mettler-Toledo International Trading (Shanghai) Co., Ltd, Shanghai (CN)

(72) Inventors: ShenHui Wang, Changzhou (CN); JingKe Wang, Changzhou (CN); ZhengQuan Liu, Changzhou (CN); Qin Sun, Changzhou (CN)

(73) Assignees: Mettler-Toledo (Changzhou) Measurement Technology Co., Ltd, Changzhou (CN); Mettler-Toledo (Changzhou) Precision Instruments Co., Ltd, Changzhou (CN); Mettler-Toledo International Trading (Shanghai) Co., Ltd, Shanghai (CN)

( * ) Notice: Subject to any disclaimer, the term of this patent is extended or adjusted under 35 U.S.C. 154(b) by 17 days.

(21) Appl. No.: 17/455,813

(22) Filed: Nov. 19, 2021

(65) Prior Publication Data
US 2022/0173758 A1   Jun. 2, 2022
US 2023/0396276 A9   Dec. 7, 2023

(30) Foreign Application Priority Data
Nov. 26, 2020   (CN) .......................... 202011349272.4

(51) Int. Cl.
*H04B 1/10* (2006.01)

(52) U.S. Cl.
CPC ... *H04B 1/1036* (2013.01); *H04B 2001/1045* (2013.01); *H04B 2001/1063* (2013.01)

(58) Field of Classification Search
CPC .......... H04B 1/1036; H04B 2001/1045; H04B 2001/1063; G01G 15/00; G01G 19/00; G01G 23/01; G01V 8/10; G01V 13/00
See application file for complete search history.

(56) References Cited

U.S. PATENT DOCUMENTS 5,678,031 A * 10/1997 Shiratori ............... G06F 11/261
                                                    714/724
6,108,528 A *  8/2000 Lyu ......................... H03K 9/08
                                                    455/220

(Continued)

FOREIGN PATENT DOCUMENTS

CN          110697168 B     4/2021

*Primary Examiner* — Jinsong Hu
*Assistant Examiner* — Rui M Hu
(74) *Attorney, Agent, or Firm* — Standley Law Group LLP; Jeffrey S. Standley; Adam J. Smith

(57) ABSTRACT

A method for real-time processing of a detection signal, wherein signal processing is respectively performed when a detection signal is converted from a high level to a low level or vice versa. A moment at which a level of the detection signal is converted is recorded as a start point. A status of the detection signal is then detected in real time at a current moment. A current time width is compared to a maximum interval width of pre-set interference signals, and signal levels are determined and recorded from the start point to the current moment. Using characteristics of different interference signals, anti-interference processing is performed by using a targeted edge positioning and width recognition method, so that the delay impact of filtering on signals is avoided, improving both the recognition precision of weighing data of a checkweigher and the overall performance of the checkweigher.

9 Claims, 3 Drawing Sheets

(56) References Cited

U.S. PATENT DOCUMENTS

| | | | | |
|---|---|---|---|---|
| 6,389,912 B1* | 5/2002 | Wood | | G01N 15/1218 |
| | | | | 73/865.5 |
| 6,586,938 B1* | 7/2003 | Paltoglou | | G01V 3/104 |
| | | | | 324/239 |
| 6,687,638 B2 | 2/2004 | Poterek et al. | | |
| 6,791,311 B2* | 9/2004 | Murphy | | G01R 29/0842 |
| | | | | 324/72 |
| 7,038,512 B2* | 5/2006 | Wilson | | H03K 5/01 |
| | | | | 327/170 |
| 8,594,580 B2* | 11/2013 | Nishikawa | | G06K 7/0008 |
| | | | | 340/10.3 |
| 10,158,361 B2* | 12/2018 | Toda | | H03K 17/964 |
| 10,826,606 B1* | 11/2020 | Lundberg | | H04B 10/70 |
| 10,962,584 B2* | 3/2021 | Candela | | G01R 31/08 |
| 11,454,735 B2* | 9/2022 | Monnier | | G01V 3/08 |
| 2007/0202823 A1* | 8/2007 | Marsh | | H04B 1/1018 |
| | | | | 455/223 |
| 2008/0011951 A1* | 1/2008 | Delcher | | B05C 11/1005 |
| | | | | 250/339.04 |
| 2008/0199102 A1* | 8/2008 | Namiki | | H04N 19/117 |
| | | | | 382/268 |
| 2008/0298514 A1* | 12/2008 | Jones | | G01S 7/021 |
| | | | | 375/342 |
| 2009/0228746 A1* | 9/2009 | Yang | | H03L 7/085 |
| | | | | 714/707 |
| 2010/0085161 A1* | 4/2010 | Nishikawa | | G06K 7/0008 |
| | | | | 340/10.3 |
| 2010/0129940 A1* | 5/2010 | Little | | G01H 11/06 |
| | | | | 73/649 |
| 2010/0245052 A1* | 9/2010 | Kitayoshi | | G06K 19/07749 |
| | | | | 340/10.4 |
| 2014/0039473 A1* | 2/2014 | Liu | | A61N 5/0616 |
| | | | | 606/9 |
| 2015/0109603 A1* | 4/2015 | Kim | | G01S 17/10 |
| | | | | 356/4.07 |
| 2018/0164433 A1* | 6/2018 | Mishima | | G08G 1/16 |
| 2021/0365000 A1* | 11/2021 | Mittelstädt | | G05B 19/0425 |
| 2022/0057465 A1* | 2/2022 | Xie | | G01R 33/543 |
| 2022/0128728 A1* | 4/2022 | Golwala | | G01H 1/00 |
| 2022/0199191 A1* | 6/2022 | Nguyen | | G11C 29/50 |
| 2023/0048083 A1* | 2/2023 | Mahara | | G01S 7/4865 |

\* cited by examiner

METHOD FOR REAL-TIME PROCESSING OF A DETECTION SIGNAL AND A DETECTOR

CROSS-REFERENCE TO RELATED APPLICATIONS

This patent application claims priority to Chinese application 202011349272.4, which was filed on 26 Nov. 2020 and which is incorporated by reference as if fully recited herein.

TECHNICAL FIELD

The inventive concept relates to a real-time processing method for a detection signal of a detector.

BACKGROUND ART

When a weighed object passes through a conveying belt, a loading moment and a removing moment of the object are detected by a photoelectric detector, such that a weighing stage in which the object completely rests on the conveying belt is identified, and a checkweighing weight is then calculated using the weighing data captured during the weighing stage.

The accuracy and reliability of signals of the photoelectric detector are preconditions for accurate and reliable weighing of a checkweigher. In the weighing process, a detection signal of the photoelectric detector is subjected to electrical interference and mechanical vibration interference, thereby affecting the accuracy and reliability of the signals of the photoelectric detector. The electrical interference occurs due to the periodic or short-term impact characteristics of the interference, the periodic and impact interference characteristics of the interference signal. The mechanical vibration interference occurs in the following case: due to the alignment relationship between a reflector of the photoelectric detector and a light emitter, a signal is blocked because light from the light emitter is usually incident on the outside of the reflector, thereby forming an interference signal.

In general, filtering methods are used to process the anti-interference processing data of signals of the photoelectric detector. However, these filtering methods may result in positioning delays of the processed signal in time domain, and these delays are affected by width and frequency of the interference signal, thereby causing a position deviation of the positioning signal obtained by the photoelectric detector, and further causing a position deviation of the identified weighing data. As a result, the weighing performance of the checkweigher is degraded.

In view of these disadvantages, an objective of the inventive concept is to provide a processing method for a detection signal, wherein different types of interference signals can be analyzed and processed at the same time, so that the delay impact of filtering on signals is avoided, the recognition precision of weighing data of a checkweigher is improved, and the performance of the checkweigher is improved.

SUMMARY

The inventive concept provides method for a real-time processing of a detection signal, wherein signal processing is respectively performed when a detection signal is converted from a high level to a low level or from a low level to a high level, the method comprising: recording, as a start point, a moment at which a level of the detection signal is converted, acquiring in real time a status of the detection signal at a current moment, comparing a current time width with a maximum interval width of preset interference signals, and determining and recording signal levels from the start point to the current moment.

Further, the interference signals comprise blocking interference signals or application interference signals.

In the inventive concept, according to signal conversion types, different analysis methods are used for different interference signals according to the characteristics of different interference signals, and these interference signals are pertinently eliminated, so that the recognition precision of weighing signals is improved, and the performance of the checkweigher is improved.

When the detection signal is converted from the low level to the high level, the moment at which the level is converted is recorded as the start point, a level status of the detection signal at the current moment is acquired in real time, and a current width of the high level signal is compared with a maximum interval width of the blocking interference signals, and if blocking is determined, the high level is changed to the low level; and if no blocking is determined, the detection signal is set to high level.

If it is not possible to determine whether there is blocking or an interval, no processing is performed on the signal.

When the detection signal is converted from the high level to the low level, the moment at which the level is converted is recorded as the start point, a level status of the detection signal at the current moment is detected in real time, and a current width of the low level signal is compared with a maximum interval width of the application interference signals, and if an interval is determined, the low level is changed to the high level; and if no interval is determined, the detection signal is at the low level.

Further, the real-time detection comprises detection with an equal time interval, or detection with an indefinite time interval.

According to the conversion of the signal level, a corresponding analysis method and the maximum interval width of the preset interference signals are respectively used for analysis and determination, thereby improving the accuracy and precision of the analysis. Meanwhile, the progress of the analysis and determination is accelerated through the real-time detection.

The inventive concept further provides a detector that comprises a detection switch and a signal processor, wherein the detection switch is configured to obtain an initial signal, and the signal processor processes the initial signal using the real-time processing method for a detection signal as mentioned above.

The inventive concept further provides a storage medium that comprises a stored program that, when running, controls an apparatus where the storage medium is located to perform the real-time processing method for a detection signal as mentioned above.

In conclusion, as provided in the inventive concept, according to characteristics of different interference signals, anti-interference processing is performed by using a targeted edge positioning and width recognition method, so that the delay impact of filtering on signals is avoided, the recognition precision of weighing data of a checkweigher is improved, and the performance of the checkweigher is improved. Meanwhile, the progress of the analysis and determination is accelerated through the real-time detection.

BRIEF DESCRIPTION OF THE DRAWINGS

A better understanding of the inventive concept will be obtained by review of the accompanying drawings, which are incorporated into, and constitute a part of, the present application, show the embodiments of the inventive concept, wherein identical parts are identified with identical part numbers and wherein.

DETAILED DESCRIPTION OF THE EMBODIMENTS

To enable those of skill in the art to better understand the technical solution in the embodiments of the inventive concept, the technical solution will be clearly and completely described in conjunction with the accompanying drawings in the embodiments of the inventive concept. It will be apparent that the described embodiments are merely a part of, but not all, the embodiments of the inventive concept. All other embodiments obtained by those of ordinary skill in the art, based on embodiments in the embodiments of the inventive concept, are intended to fall within the scope of protection of the embodiments of the inventive concept.

Figure 1A:
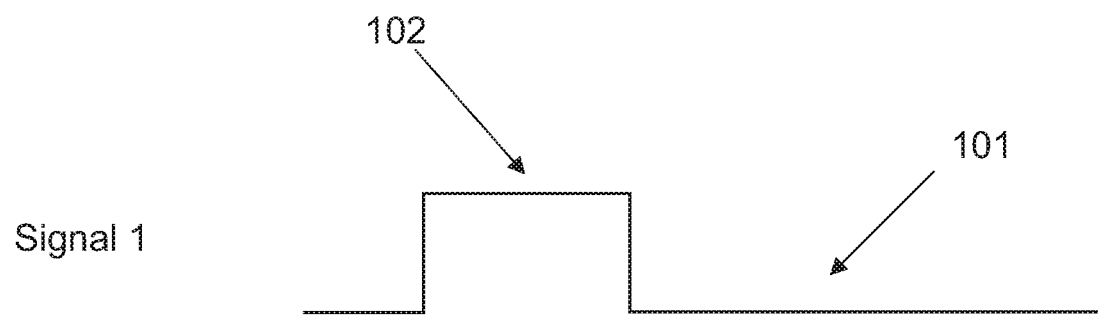
FIGS. 1a through 1c schematically depict output signals obtained from a detector.
Figure 1B:
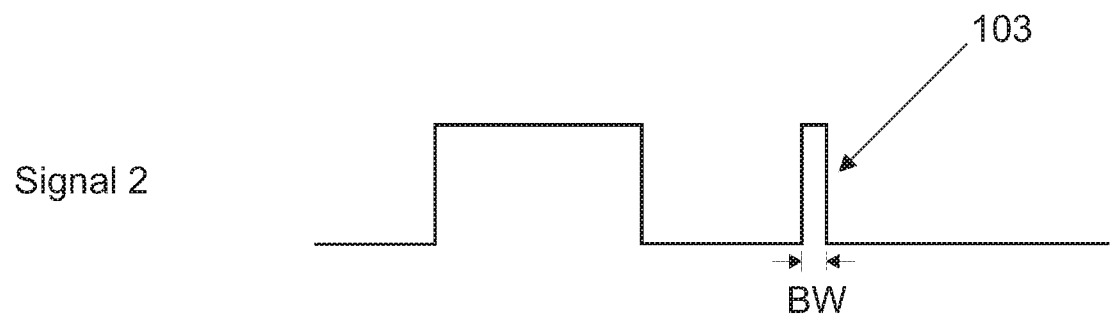
Figure 1C:
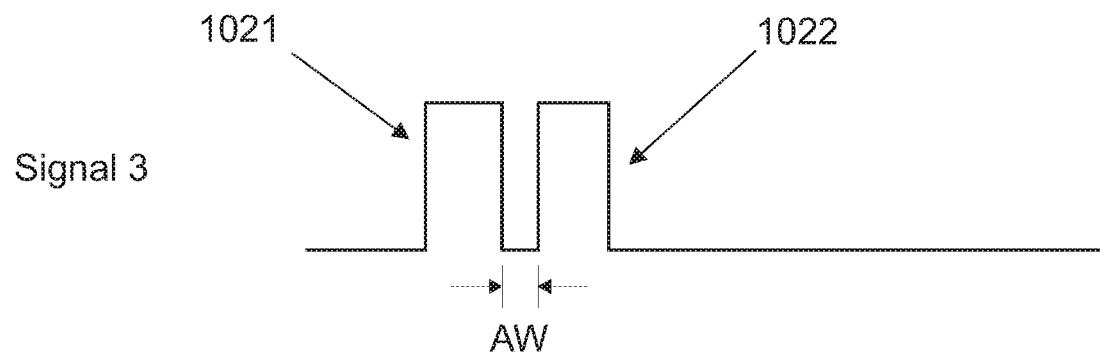

FIGS. 1a through 1c illustrate types of output signals received from a detector.

In FIG. 1a, an ideal detection signal 1 is depicted. When no weighed object is detected, the detector outputs a signal at a low level 101. When a weighed object is detected, the detector outputs a signal at a high level 102.

In a practical situation, as represented by signal 2 in FIG. 1b, when a weighed object or a detector shakes, for example, a detection signal falls outside the detection screening zone, i.e., a high level 102, resulting in a glitch signal 103 as output. The glitch signal 103 is commonly generated when the weighed object or the detector is subjected to vibration. The glitch signal 103 is referred to a blocking interference signal, and the maximum interval width of the blocking interference signal is set to a maximum interval width BW. Based on vibration frequency and amplitude of the detector, the glitch signal typically does not exceed 50 ms in duration.

As shown in FIG. 1c, a signal 3 may occur when the weighed object is of an irregular shape. The signal 3, what would be the high-level signal 102 of FIG. 1a, is broken into a pair of disconnected high level signals 1021 and 1022, is referred to as an application interference signals. A maximum interval width of the application interference signals is set to maximum interval width AW.

Figure 2:
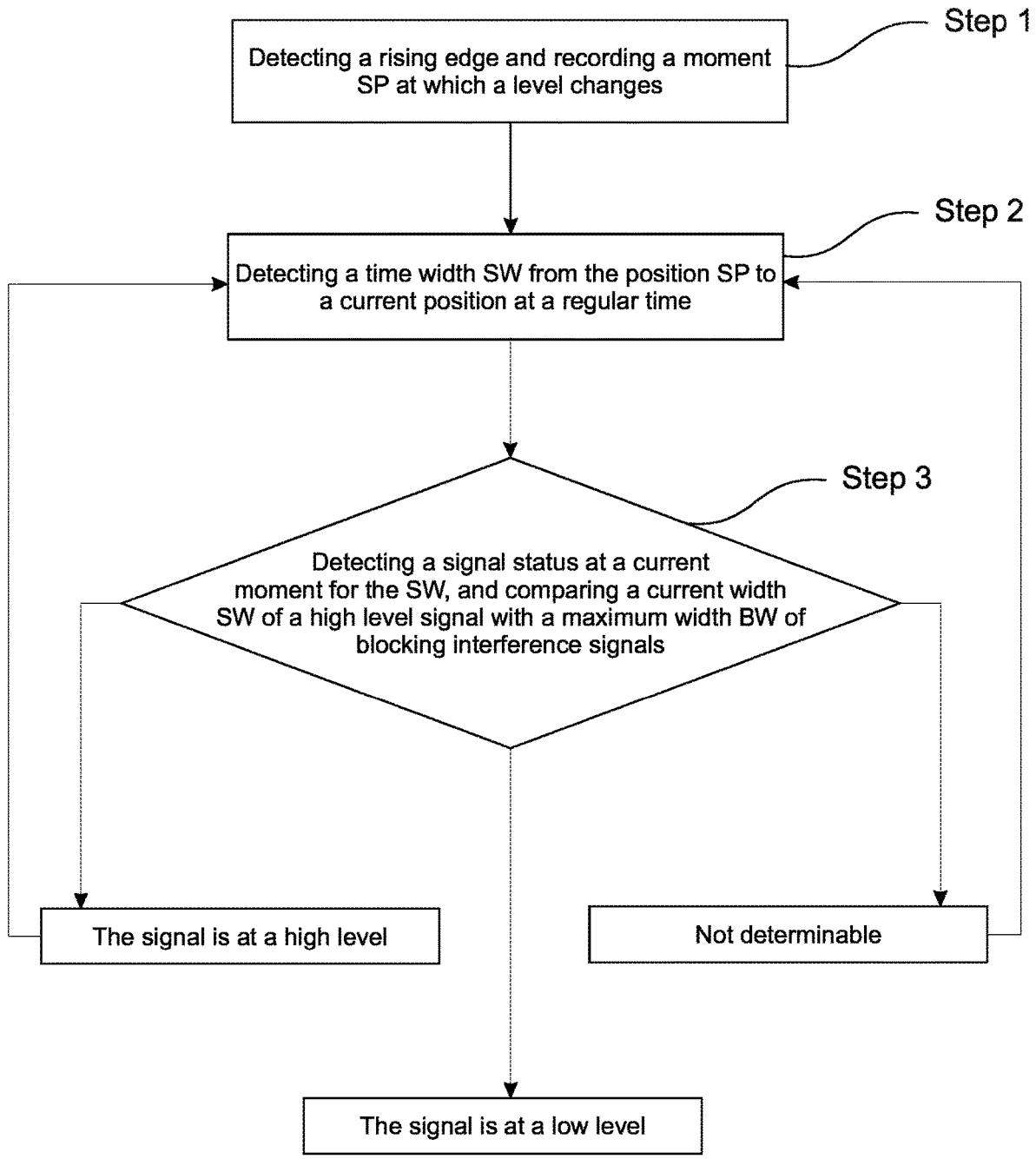
FIG. 2 is a flowchart of a method for real-time processing of a detection signal having a rising edge.
Figure 3:
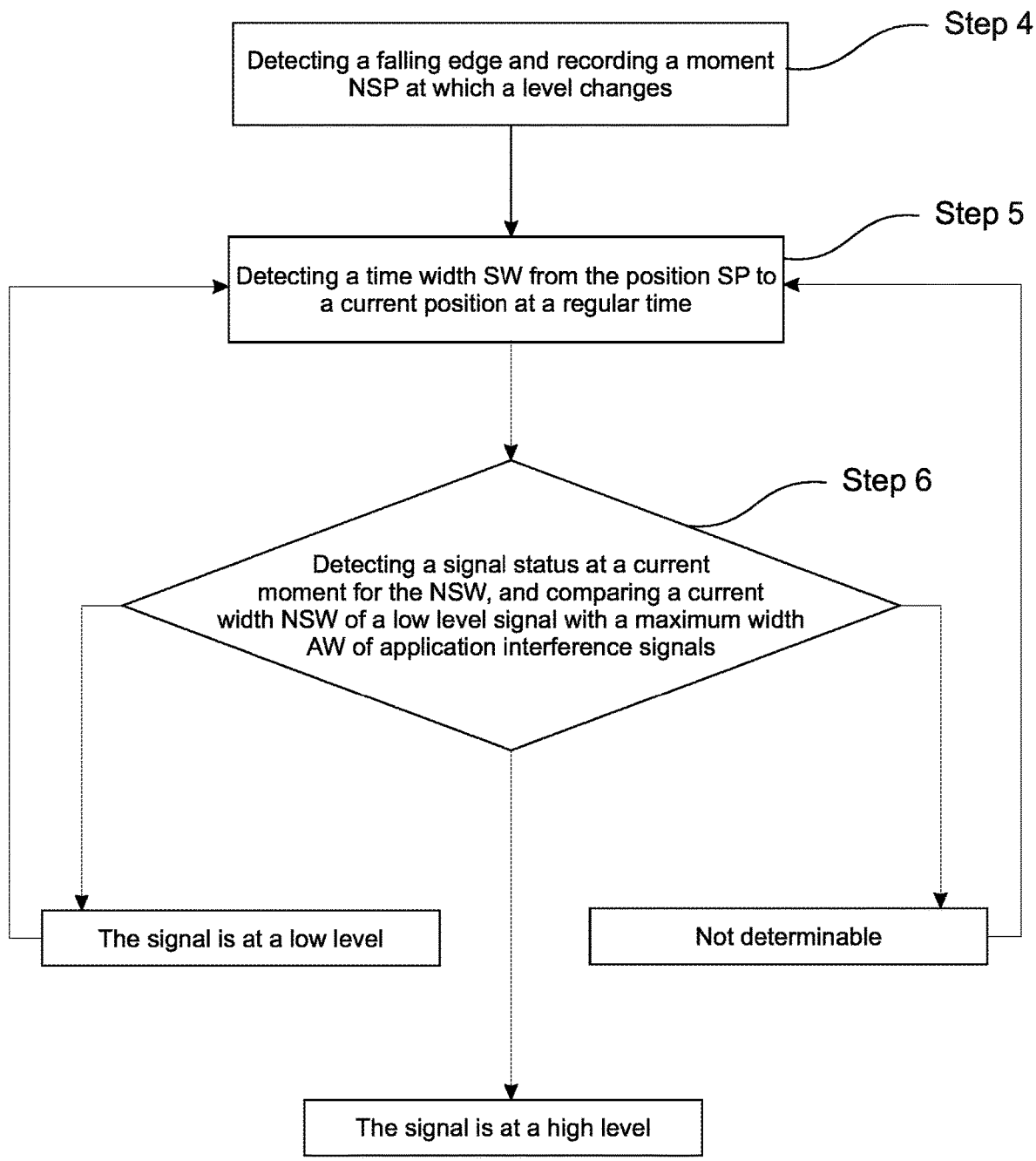
FIG. 3 shows a flowchart of a method for real-time processing of a detection signal having a falling edge.

FIGS. 2 and 3 are flowcharts that depict methods for real-time processing method for a detection signal.

In the processing method for a detection signal in FIG. 2, according to step 1, the starting point moment SP at which the signal 2 is converted from a low level to a high level is recorded.

According to step 2 of the FIG. 2 method, time is initialized from position SP, and a time width SW from position SP to the current position is detected at regular intervals of time. For example, if the time width is set for detection once every 2 ms, the current time widths SW of the high level signal are sequentially 2 ms, 4 ms, 6 ms, etc.

According to step 3, signal analysis is performed at a high level state. A signal status at current moment for the time with SW is detected, and a current width SW of the high level signal is compared with a maximum interval width BW of blocking interference signals, and it is determined whether the method can proceed to step 4.

If the current interval width SW of the high level signal is 2 ms, which is less than the maximum interval width BW, 50 ms, of the blocking interference signals, the signal does not change to the low level. Whether there is an existing blocking cannot be determined at this moment, and hence no processing is performed on the signal.

The above steps 1 to 3 are repeated. When the current time width SW of the high level signal is 52 ms, which is greater than the maximum interval width BW, 50 ms, of the blocking interference signals, and the signal does not change to the low level, the status from the position SP to this moment will continue to be recorded as unblocking, and the signal from the position SP to this moment is recorded as a high level signal.

Signal analysis at the low level state in step 4 is not performed until any one of the following cases occurs, as shown in FIG. 3.

According to Case 1, when the current time width SW of the high level signal is 30 ms, which is less than the maximum interval width BW, 50 ms, of the blocking interference signals, but if the signal changes to low level at this moment, the status from position SP to this moment is recorded as blocking, and the signal from the position SP to this moment is recorded as low level.

According to Case 2, when the current time width SW of the high level signal is 60 ms, which is greater than the maximum interval width BW, 50 ms, of the blocking interference signals, and if the signal changes to the low level at this moment, the status from the position SP to this moment is recorded as unblocking, and the signal from the position SP to this moment is recorded as the low level.

In both Case 1 or Case 2, the moment NSP at which the signal changes to low level is recorded, and then the signal analysis at low level state is performed in step 4.

According to step 4, signal analysis at the low level state is performed. The maximum interval width AW of the application interference signals is set, for example, to 30 ms.

Next, the method proceeds to step 5, in which time is initialized from the position NSP, and a time width NSW from the position NSP to the current position is detected at regular intervals of time. For example, if the time width is set to be detected once every 3 ms, the current time widths NSWs of the low level signal are sequentially 3 ms, 6 ms, 9 ms, etc.

Next, the method proceeds to step 6, in which the signal in different time widths NSW is analyzed and determined. A signal status at a current moment for the NSW is detected, and a current time width NSW of the low level signal is compared with a maximum interval width AW of application interference signals, and continuation to step 3 is determined.

If the current time width NSW of the low level signal is 3 ms, which is less than the maximum interval width AW, 30 ms, of the application interference signals, the signal does not change to the high level, and whether there is an interval cannot be determined at this moment, and no processing is performed on the signal.

The above steps are repeated. When the current time width NSW of the low level signal is 33 ms, which is greater than the maximum interval width AW, 30 ms, of the application interference signals, and the signal does not change to the high level, the status from the position NSP to this moment is still recorded as no interval, and the signal from the position NSP to this moment is recorded as low level.

Signal analysis at the high level state in step 3 is not performed until any one of the following cases occurs.

According to Case 3, when the current time width NSW of the low level signal is 15 ms, which is less than the maximum interval width AW, 30 ms, of the application interference signals, and the signal has changed to the high level, the status from the position NSP to this moment is regarded as having an interval, and the signal from the position NSP to this moment is recorded as the high level.

According to Case 4, when the current time width NSW of the low level signal is 33 ms, which is greater than the maximum interval width AW, 30 ms, of the application interference signals, and the signal has changed to the high level, the status from the position NSP to this moment is regarded as having no interval, and the signal from the position NSP to this moment is recorded as the low level.

For Case 3 or Case 4, a moment at which the signal changes to the high level is recorded as SP, and the signal analysis at the high level state is performed in step 3.

In the inventive concept, detection, analysis, and determination are performed in real time. Therefore, weighing and analysis can be simultaneously performed during use, rather than weighing first and then analyzing and determining the detection signal. This possibility not only saves time, but also avoids a time delay effect caused by using a filter.

In the above embodiment, when the detector detects no weighed object, the output signal is set to a low level, and when the detector detects a weighed object, the output signal is set to a high level. Conversely, if the output signal is set to the high level when the detector detects no weighed object, and the output signal is set to the low level when the detector detects a weighed object, steps 4 to 6 are first implemented to perform signal analysis at the low level state, and when no weighed object is detected, signal analysis at the high level state is performed in steps 1 to 3.

According to the above analysis, a loading moment and a removing moment of the object that are detected by the detector are obtained, such that a weighing stage in which the object completely rests on a conveying belt is identified, and a checkweighing weight is then calculated according to weighing data in the weighing stage.

The inventive concept further provides a detector that comprises a detection switch and a signal processor. The detection switch is configured to obtain an initial signal, and the signal processor processes the initial signal using the real-time processing method for a detection signal as mentioned above.

In the inventive concept, according to signal conversion types, different analysis methods are used for different interference signals according to the characteristics of different interference signals. The maximum interval width of the pre-set interference signals is used for analysis and validation, thereby improving the accuracy and precision of the analysis. These interference signals are pertinently eliminated, so that the recognition precision of signal processing is improved, thus improving the performance of the checkweigher. In addition, the above analysis method has high reusability, considering that different interference signals may be repeated a plurality of times in the same signal.

It can be learned from the description of the real-time processing method for a detection signal above that, those skilled in the art may clearly understand that the inventive concept may be implemented by means of software plus a necessary hardware platform. Based on such an understanding, the technical solution of the inventive concept, in essence or the contribution to the prior art, may be embodied in the form of a software product, and the computer software product may be stored in a storage medium, including but not limited to a ROM/RAM (Read-Only Memory/Random Access Memory), a magnetic disk, an optical disk, etc., which includes several instructions that cause one or more computer devices (which may be a personal computer, a server, or a network device) to carry out the methods described in various embodiments or some parts in the embodiments of the inventive concept.

The real-time processing method for a detection signal in the inventive concept may be described in a general context of a computer executable instruction executed by a computer, for example, a program module. Generally, the program module includes a program, an object, a component, a data structure, etc. for performing a specific task or implementing a specific abstract data type. The inventive concept may also be practiced in distributed computing environments where a task is performed by a remote processing device that is connected over a communication network. In the distributed computing environments, the program module may be located in local and remote computer storage media, including a storage device.

REFERENCE SIGNS LIST

101 Low level signal
102 High level signal
103 Glitch signal
1021 Divided signal of signal 102
1022 Divided signal of signal 102
AW, BW maximum interval width
SP, NSW moment at which a level of the detection signal is converted
SW, NSW current time width

What is claimed is:

1. A method for real-time processing of detection signals that are converted between a high level and a low level, the method comprising:
   respectively, for each of the detection signals, some of which are high-level signals and some of which are low-level signals;
   recording, as a start point, a moment at which a level of the detection signal is converted;
   detecting, in real time, a level status of the detection signal at a current moment;
   comparing a current time width of the detection signal with a maximum interval width of pre-set interference signals, where the detection signal is one of high-level signals the pre-set interference signals comprise blocking signal, and where the detection signal is one of the low-level signals the pre-set interference signals comprise application interference signals; and
   determining and recording signal levels from the start point to the current moment;
   for a given one of the high-level signals, determining blocking and, in response, changing the high level to the low level;
   for another given one of the high-level signals, determining no blocking and, in response, setting the detection signal to the high level;
   for a given one of the low-level signals, determining an interval and, in response, changing the low level to the high level; and
   for another given one of the low-level signals, determining no interval and, in response, setting the detection signal to the low level.

2. The method of claim 1, wherein the step of detecting in real-time comprises detection at an equal time interval.

3. The method of claim 1, wherein the step of detecting in real-time comprises detection at an indefinite time interval.

4. A detector comprising:
a detection switch configured to obtain an initial signal; and
a signal processor configured to process a detection signal comprising the initial signal in real-time;
recording, as a start point, a moment at which a level of the detection signal is converted;
detecting a status of the detection signal at a current moment;
comparing a current time width with a maximum interval width of pre-set interference signals, which comprise blocking interference signals or application interference signals; and
determining and recording signal levels from the start point to the current moment;
wherein, when the detection signal is converted from the low level to the high level;
the moment at which the level is converted is recorded as the start point;
a level status of the detection signal at the current moment is detected in real time; and
the current time width of the high level signal is compared with the maximum interval width of the blocking interference signals;
wherein:
if blocking is determined, the high level is changed to the low level; and
if no blocking is determined, the detection signal is set to the high level; and
the moment at which the level is converted is recorded as the start point;
a level status of the detection signal at the current moment is detected in real time; and
the current time width of the low level signal is compared with the maximum interval with of the application interference signals;
wherein
if an interval is determined, the low level is changed to the high level; and
if no interval is determined, the detection signal is set to the low level.

5. The detector of claim 4, wherein:
the real-time processing comprises detection at an equal time interval.

6. The detector of claim 4, wherein:
the real-time processing comprises detection at an indefinite time interval.

7. A non-transitory storage medium comprising a stored program that, when executed, controls an apparatus where the storage medium is located to process a detection signal in real time by:
recording, as a start point, a moment at which a level of the detection signal is converted;
detecting in real time a status of the detection signal at a current moment;
comparing a current time width with a maximum interval width of pre-set interference signals, which comprise blocking interference signals or application interference signals; and
determining and recording signal levels from the start point to the current moment;
wherein, when the detection signal is converted from the low level to the high level;
the moment at which the level is converted is recorded as the start point;
a level status of the detection signal at the current moment is detected in real time; and
the current time width of the high level signal is compared with the maximum interval width of the blocking interference signals;
wherein:
if blocking is determined, the high level is changed to the low level; and
if no blocking is determined, the detection signal is set to the high level; and
when the detection signal is converted from the high level to the low level;
the moment at which the level is converted is recorded as the start point;
a level status of the detection signal at the current moment is detected in real time; and
the current time width of the low level signal is compared with the maximum interval with of the application interference signals;
wherein
if an interval is determined, the low level is changed to the high level; and
if no interval is determined, the detection signal is set to the low level.

8. The non-transitory storage medium of claim 7, wherein:
the real-time processing comprises detection at an equal time interval.

9. The non-transitory storage medium of claim 7, wherein:
the real-time processing comprises detection at an indefinite time interval.

* * * * *

UNITED STATES PATENT AND TRADEMARK OFFICE
CERTIFICATE OF CORRECTION

PATENT NO. : 11,967,982 B2
APPLICATION NO. : 17/455813
DATED : April 23, 2024
INVENTOR(S) : Wang et al.

Page 1 of 1

It is certified that error appears in the above-identified patent and that said Letters Patent is hereby corrected as shown below:

In the Claims

In Column 6, Line 41, Claim 1, please delete "signals;" and insert -- signals: --.

In Column 7, Line 21, Claim 4, please delete "level;" and insert -- level: --.

In Column 7, Line 39, Claim 4, please delete "interval with" and insert -- interval width --.

In Column 7, Line 41, Claim 4, please insert -- : -- after "wherein".

In Column 8, Line 36, Claim 7, please delete "interval with" and insert -- interval width --.

In Column 8, Line 38, Claim 7, please insert -- : -- after "wherein".

Signed and Sealed this
Fourth Day of June, 2024

Katherine Kelly Vidal
*Director of the United States Patent and Trademark Office*